（12）United States Patent
Benedict et al.

(10) Patent No.: US 11,673,663 B2
(45) Date of Patent: Jun. 13, 2023

(54) MULTI-MODAL VEHICLE

(71) Applicants: The Texas A&M University System, College Station, TX (US); University of Maryland, College Park, College Park, MD (US)

(72) Inventors: Moble Benedict, College Station, TX (US); Hunter Denton, Hawkins, TX (US); Vikram Hrishikeshavan, Hyattsville, MD (US)

(73) Assignees: The Texas A&M University System, College Station, TX (US); University of Maryland, College Park, MD (US)

( * ) Notice: Subject to any disclaimer, the term of this patent is extended or adjusted under 35 U.S.C. 154(b) by 830 days.

(21) Appl. No.: 16/614,827

(22) PCT Filed: May 21, 2018

(86) PCT No.: PCT/US2018/033713
§ 371 (c)(1),
(2) Date: Nov. 19, 2019

(87) PCT Pub. No.: WO2018/213836
PCT Pub. Date: Nov. 22, 2018

(65) Prior Publication Data
US 2020/0207469 A1    Jul. 2, 2020

Related U.S. Application Data

(60) Provisional application No. 62/508,640, filed on May 19, 2017.

(51) Int. Cl.
*B64C 37/00* (2006.01)
*B60F 5/02* (2006.01)
(Continued)

(52) U.S. Cl.
CPC ............... *B64C 37/00* (2013.01); *B60F 5/02* (2013.01); *B64C 27/52* (2013.01); *B64C 39/024* (2013.01);
(Continued)

(58) Field of Classification Search
CPC .................................. B64C 37/00; B60F 5/02
(Continued)

(56) References Cited

U.S. PATENT DOCUMENTS 1,021,338 A * 3/1912 Rush ....................... B64C 25/50
                                                                      244/50
1,820,467 A * 8/1931 Liska ...................... B64C 11/36
                                                                     416/189
(Continued)

FOREIGN PATENT DOCUMENTS

CN     105196815 A  * 12/2015
CN     106080070 A  * 11/2016 ................ B60F 5/02
(Continued)

OTHER PUBLICATIONS

International Search Report and Written Opinion dated Aug. 28, 2018, for International Application No. PCT/US2018/033713.

*Primary Examiner* — Christopher P Ellis
(74) *Attorney, Agent, or Firm* — Conley Rose, P.C.

(57) ABSTRACT

A multi-modal vehicle includes a frame, a rotor pivotally mounted to the frame, the rotor including a first position and a second position circumferentially spaced from the first position, and a motor coupled to the rotor and configured to rotate the rotor, wherein, when the rotor is disposed in the first position, the rotor is configured to generate lift when actuated by the motor, wherein, when the rotor is disposed in the second position, the rotor is configured to engage a surface to transport the vehicle when actuated by the motor.

18 Claims, 17 Drawing Sheets

(51) Int. Cl.
  *B64C 27/52* (2006.01)
  *B64C 39/02* (2023.01)
  *B64D 27/24* (2006.01)
  *B64U 10/13* (2023.01)
  *B64U 30/20* (2023.01)
  *B64U 50/19* (2023.01)

(52) U.S. Cl.
  CPC .............. *B64D 27/24* (2013.01); *B64U 10/13* (2023.01); *B64U 30/20* (2023.01); *B64U 50/19* (2023.01)

(58) Field of Classification Search
  USPC .................................................. 244/50, 17.23
  See application file for complete search history.

(56) References Cited

U.S. PATENT DOCUMENTS

| | | | | |
|---|---|---|---|---|
| 7,959,104 | B2 * | 6/2011 | Kuntz | B64C 29/0033 |
| | | | | 244/50 |
| 8,794,564 | B2 * | 8/2014 | Hutson | F16M 11/18 |
| | | | | 244/50 |
| 8,794,566 | B2 * | 8/2014 | Hutson | F16M 13/02 |
| | | | | 244/50 |
| 9,364,766 | B2 * | 6/2016 | Mielniczek | A63H 33/003 |
| 9,688,400 | B2 * | 6/2017 | Hutson | B60F 5/02 |
| 10,322,796 | B2 * | 6/2019 | Lee | B64C 15/12 |
| 10,464,620 | B2 * | 11/2019 | Arigoni | G05D 1/027 |
| D875,023 | S * | 2/2020 | Lee | D12/328 |
| 10,675,932 | B2 * | 6/2020 | Nam | B60F 5/02 |
| 10,723,189 | B2 * | 7/2020 | Tang | G05D 1/0202 |
| 10,967,970 | B2 * | 4/2021 | Van Niekerk | B64C 39/024 |
| 11,338,634 | B1 * | 5/2022 | Lacaze | B64C 27/08 |
| 2008/0048065 | A1 * | 2/2008 | Kuntz | B64C 37/00 |
| | | | | 244/17.23 |
| 2015/0274000 | A1 * | 10/2015 | Meager | B60F 3/0038 |
| | | | | 180/21 |
| 2016/0121673 | A1 * | 5/2016 | Hutson | B64C 39/024 |
| | | | | 244/62 |
| 2016/0257400 | A1 | 9/2016 | Olm et al. | |

FOREIGN PATENT DOCUMENTS

| | | | | |
|---|---|---|---|---|
| CN | 106114099 A | * | 11/2016 | ................ B60F 5/02 |
| CN | 106155080 A | * | 11/2016 | ................ B63H 7/02 |
| CN | 106240262 A | * | 12/2016 | ................ B60F 5/02 |
| CN | 107323192 A | * | 11/2017 | ................ B60F 5/02 |
| CN | 210852921 U | * | 6/2020 | |
| DE | 102004063205 B3 | * | 5/2006 | ............ A63H 17/00 |
| JP | 2015-123918 A | | 7/2015 | |
| KR | 10-2013-0065078 A | | 6/2013 | |
| KR | 10-2016-0136594 A | | 11/2016 | |
| KR | 10-2017-0054896 A | | 5/2017 | |

* cited by examiner

MULTI-MODAL VEHICLE

CROSS-REFERENCE TO RELATED APPLICATIONS

This application is a 35 U.S.C. § 371 national stage application of PCT/US2018/033713 filed May 21, 2018, entitled "Multi-Modal Vehicle," which claims benefit of U.S. application No. 62/508,640 filed on May 19, 2017, both of which are incorporated herein by reference in their entirety for all purposes.

STATEMENT REGARDING FEDERALLY SPONSORED RESEARCH OR DEVELOPMENT

Not applicable.

BACKGROUND

During the last few decades there has been increased interest in the use of unmanned aerial and ground vehicles or robots for both military and civilian applications. Today, one of the most predominant forms of aerial robot is a quad-copter or a multi-copter, while for ground mobility many conventional robots rely on wheels. In practical applications, there could be many scenarios where a ground robot needs to negotiate large obstacles (larger than the wheel diameter) or even climb stairs. Similarly, for a flying robot there could be instances where terrestrial locomotion capability is highly desired for stealth purposes or for conserving energy to significantly increase mission endurance given that ground locomotion requires only a fraction of the power needed for flying. Current approaches for developing a hybrid aerial-terrestrial platform involve combining a flying vehicle with a ground robot, while using independent power actuators (motors) and propulsion systems (rotors, legs, wheels, etc.) for each mode of locomotion. For example, one could add wheels or legs to a quad-copter and have a separate set of motors for driving the wheels or legs. Another design involves using flapping wings for aerial locomotion and actuated legs for moving on the ground. Even though these approaches are feasible, they would result in highly non-optimal designs, mainly because of the additional weight and complexity of the redundant actuation systems. This also implies that such designs would not scale up with size easily. Some of the other designs use unpowered wheels and the vectored thrust from the four propellers to move the vehicle forward/backward on the ground and also for control. However, such an idea of indirect propulsion may require significantly more power, wasting the stored battery power and also lack the control authority during ground locomotion since the wheels are not powered. Another design uses a fixed-wing design and with actuated wings to crawl on the ground. However, for such designs the vehicle cannot take-off and land vertically and also crawling with wings is not an effective mode of terrestrial locomotion.

BRIEF SUMMARY OF THE DISCLOSURE

A multi-modal vehicle, comprising a frame, a rotor pivotally mounted to the frame, the rotor comprising a first position and a second position circumferentially spaced from the first position, and a motor coupled to the rotor and configured to rotate the rotor, wherein, when the rotor is disposed in the first position, the rotor is configured to generate lift when actuated by the motor, wherein, when the rotor is disposed in the second position, the rotor is configured to engage a surface to transport the vehicle when actuated by the motor. In some embodiments, the vehicle further comprises a tilting system configured to actuate the rotor between the first and second positions, the tilting system comprising an actuator. In some embodiments, the actuator comprises a servo actuator. In certain embodiments, the vehicle further comprises a control system configured to control the motor and the actuator using an algorithm. In certain embodiments, the algorithm comprises a proportional-derivative feedback controller. In some embodiments, the vehicle further comprises a shaft coupled to the motor, wherein the shaft is rotatable relative to the frame. In some embodiments, the vehicle further comprises a magnetic locking mechanism configured to lock the rotor in either the first position or the second position, wherein the second position of the rotor is circumferentially spaced 90 degrees from the first position. In certain embodiments, the locking mechanism comprises a first magnet mounted on the shaft, a second magnet mounted on the shaft, wherein the second magnet is circumferentially spaced from the first magnet, and a third magnet mounted on the frame. In certain embodiments, the first magnet is aligned with the third magnet when the rotor is in the first position and circumferentially spaced from the third magnet when the rotor is in the second position, and the second magnet is aligned with the third magnet when the rotor is in the second position and circumferentially spaced from the third magnet when the rotor is in the first position.

An embodiment of a multi-modal vehicle comprises a frame, a rotor pivotally mounted to the frame, the rotor comprising a first position and a second position circumferentially spaced from the first position about a first axis, and a motor coupled to the rotor and configured to rotate the rotor about a second axis that is different from the first axis, wherein, when the rotor is disposed in the first position, the vehicle is disposed in an aerial mode, wherein, when the rotor is disposed in the second position, the vehicle is disposed in a ground mode. In some embodiments, the rotor comprises at least one of carbon fiber prepreg, metal, and plastic. In some embodiments, the rotor comprises a plurality of circumferentially spaced blades and a cover extending about the blades. In certain embodiments, the rim comprises a rim configured to provide traction to the vehicle when the vehicle is in the ground mode to transport the vehicle along a surface, and the blades are configured to generate lift when the vehicle is in the aerial mode. In some embodiments, relative rotation is permitted between the cover and the blades of the rotor. In some embodiments, the vehicle further comprises a shaft coupled to the motor, wherein the shaft is rotatable about the first axis. In certain embodiments, the vehicle further comprises a magnetic locking mechanism configured to lock the rotor in either the first position or the second position, wherein the locking mechanism comprises a first magnet mounted on the shaft, a second magnet mounted on the shaft, wherein the second magnet is circumferentially spaced from the first magnet, and a third magnet mounted on the frame. In certain embodiments, the vehicle further comprises further comprising a tilting system configured to actuate the rotor between the first and second positions. In some embodiments, the tilting system comprises an actuator coupled to the frame, and an actuator arm coupled between the shaft and the actuator, wherein, in response to actuation of the actuator, the actuator arm is configured to rotate the shaft and the motor. In some embodiments, the vehicle further comprises a control system including a microcontroller, an inertial measurement unit, a motor controller, and a wireless transceiver. In certain embodiments, the rotor is configured to generate lift in response to actuation of the motor when the rotor is disposed in the first position, and the rotor is configured to engage a surface to transport the vehicle in response to actuation by the motor when the rotor is disposed in the second position.

BRIEF DESCRIPTION OF THE DRAWINGS

For a detailed description of the disclosed embodiments included in the disclosure, reference will now be made to the accompanying drawings in which.

DETAILED DESCRIPTION OF THE DISCLOSED EMBODIMENTS

Figure 1:
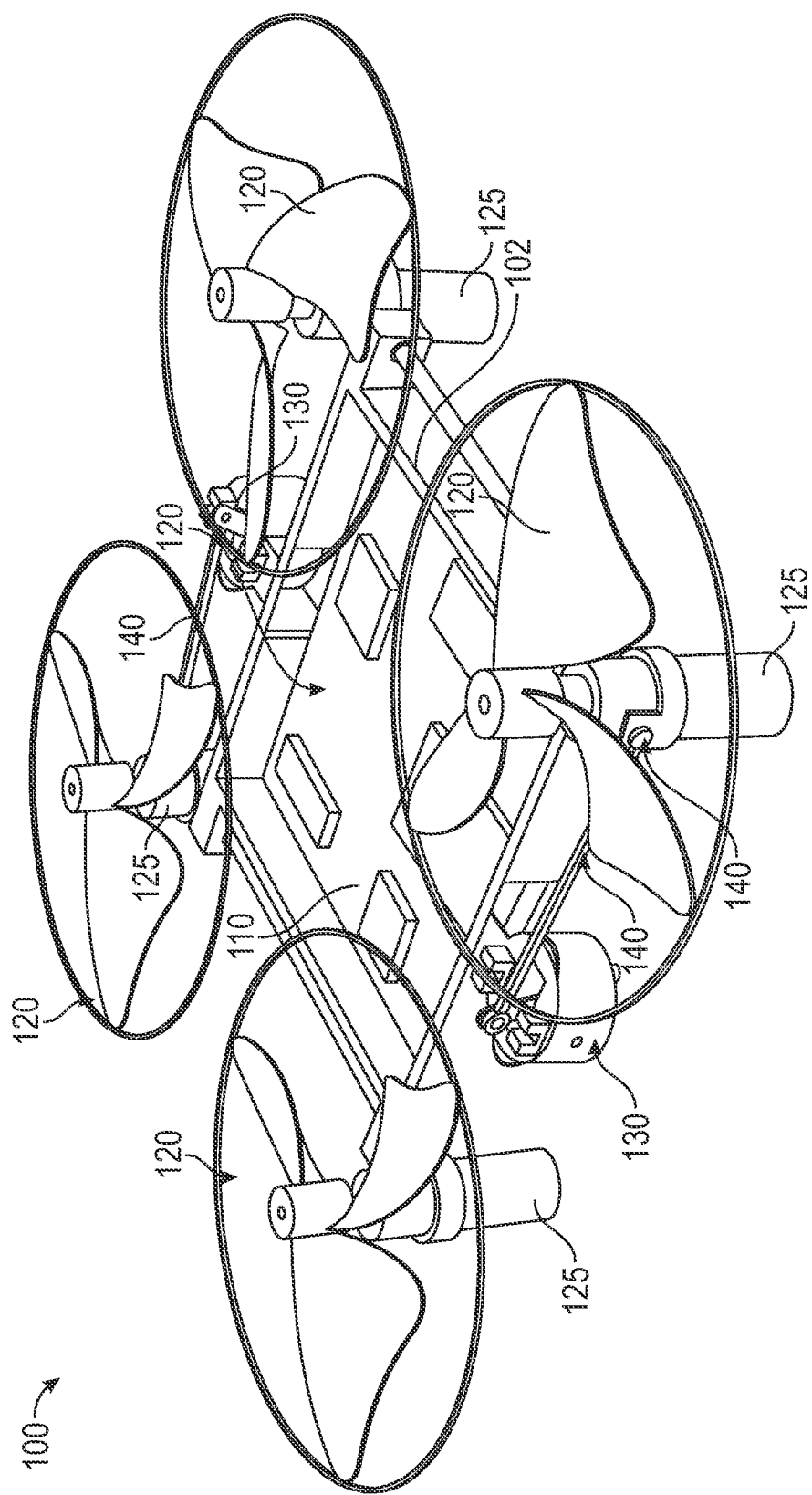
FIG. 1 is a perspective view of an embodiment of a multi-modal vehicle (MMV) in a first mode of operation in accordance with the principles disclosed herein.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

The following disclosure generally relates to transformable aerial/ground hybrid vehicles, which can perform both aerial and ground modes of locomotion by morphing their configuration with an actuation system also configured to provide propulsion for the vehicle. With the vehicles described in the present disclosure, both aerial and ground modes of locomotion may be performed by morphing the vehicle's configuration and/or geometry with the same actuation system. Additionally, morphing from one mode of locomotion to another is achieved in a relatively simple and robust manner.

Figure 2:
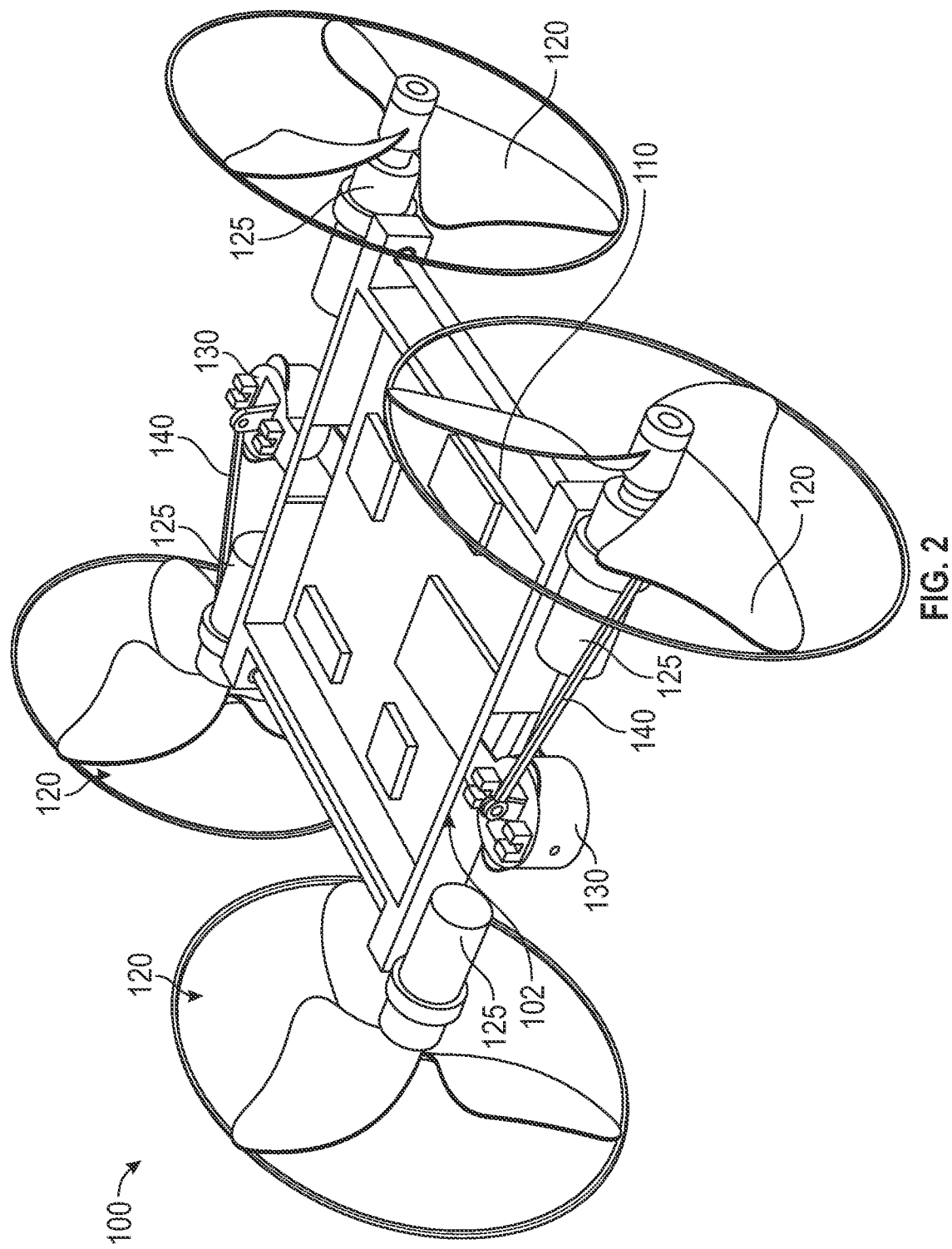
FIG. 2 is a perspective view of the MMV of FIG. 1 in a second mode of operation.

Referring to FIGS. 1, 2, an embodiment of a hybrid aerial/ground transformer robot or multi-modal vehicle (MMV) 100 is shown. MMV 100 is generally configured to operate as a quad-rotor in a first or flying mode (shown in FIG. 1) and a second or ground locomotion mode (shown in FIG. 2). For ground locomotion, MMV 100 uses actuators to tilt the rotors approximately 90 degrees, so that the rotors act as wheels in the ground locomotion or terrain mode. In the ground mode shown in FIG. 2, MMV 100 may possess superior agility when compared to conventional wheeled robots due to the independent rotational speed or rpm (revolutions per minute) control for each of the wheels or rotors along with the ability to reverse the direction of rotation (bi-directional control) of the wheels. In the embodiment of FIGS. 1, 2, MMV 100 generally includes a vehicle frame or structure 102, a control system 110 mounted to the frame 102, a plurality of propulsion elements or rotors 120, a plurality of motors 125 for powering the rotors 120, a pair of tilting actuators 130, and a pair of actuation mechanisms or assemblies 140 selectably actuated by actuators 130.

A custom control system is utilized to control MMV 100 in both modes of locomotion. In this embodiment, control system 110 comprises a processor-sensor board with a 100-200 MHz microprocessor capable of stabilization rates of 1000 Hz; however, in other embodiments, the features of control system 110 may differ. Control system 100 also includes bi-directional motor controllers that control motor rpm of motors 125 as well as change their direction to appropriately accomplish the aerial and ground modes. In this embodiment, control system 100 further includes an inertial measurement unit and a transceiver. The inertial measurement unit of control system 100 measures vehicle states used for feedback stabilization. Finally, the transceiver of system 100 relays wireless information to and from a ground station for data logging as well as issuing motion commands.

MMV 100, as well as other vehicles to be described further herein, have many military and civilian applications. For instance, military applications may include intelligence, surveillance and reconnaissance (ISR) missions by using an onboard camera, carry payload using large-scale versions of the present concept, sensing IEDs in battle field, border surveillance, etc. The ability to operate both in air and land may also allow MMV 100 and other embodiments disclosed herein to be used in other fields, such as space exploration including planetary exploration missions (Mars, Venus, Titan, etc.). MMV 100 could also complement the capabilities of a Mars rover. Some civilian applications of MMV 100 could include surveillance in urban areas, package delivery, etc. Embodiments of MMVs disclosed herein, such as MMV 100, may be configured to provide functionality similar to quad-copters while also providing ground locomotion.

Figure 3:
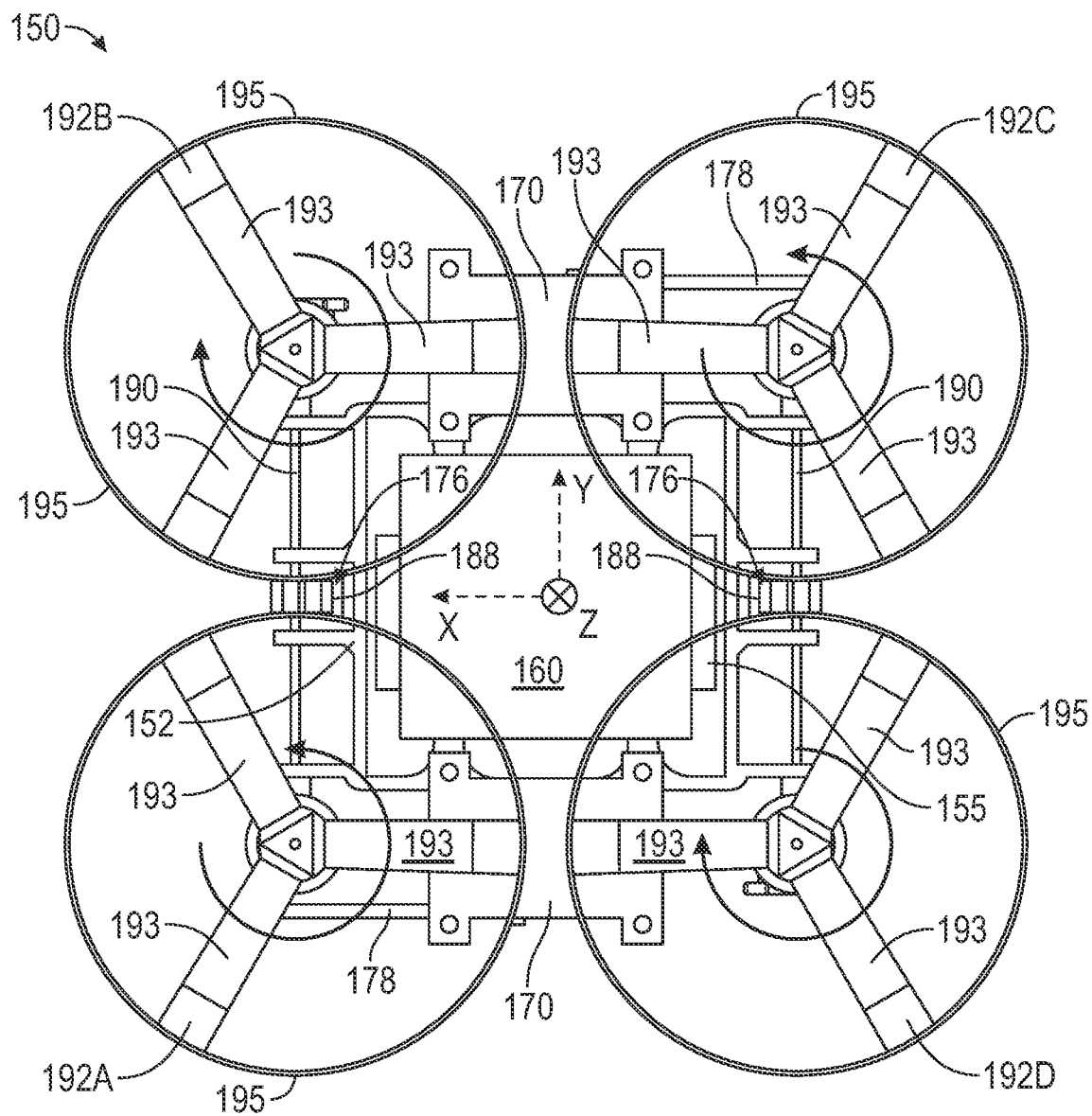
FIG. 3 is a top view of another embodiment of an MMV of FIG. 1 in a first mode of operation in accordance with the principles disclosed herein.
Figure 4:
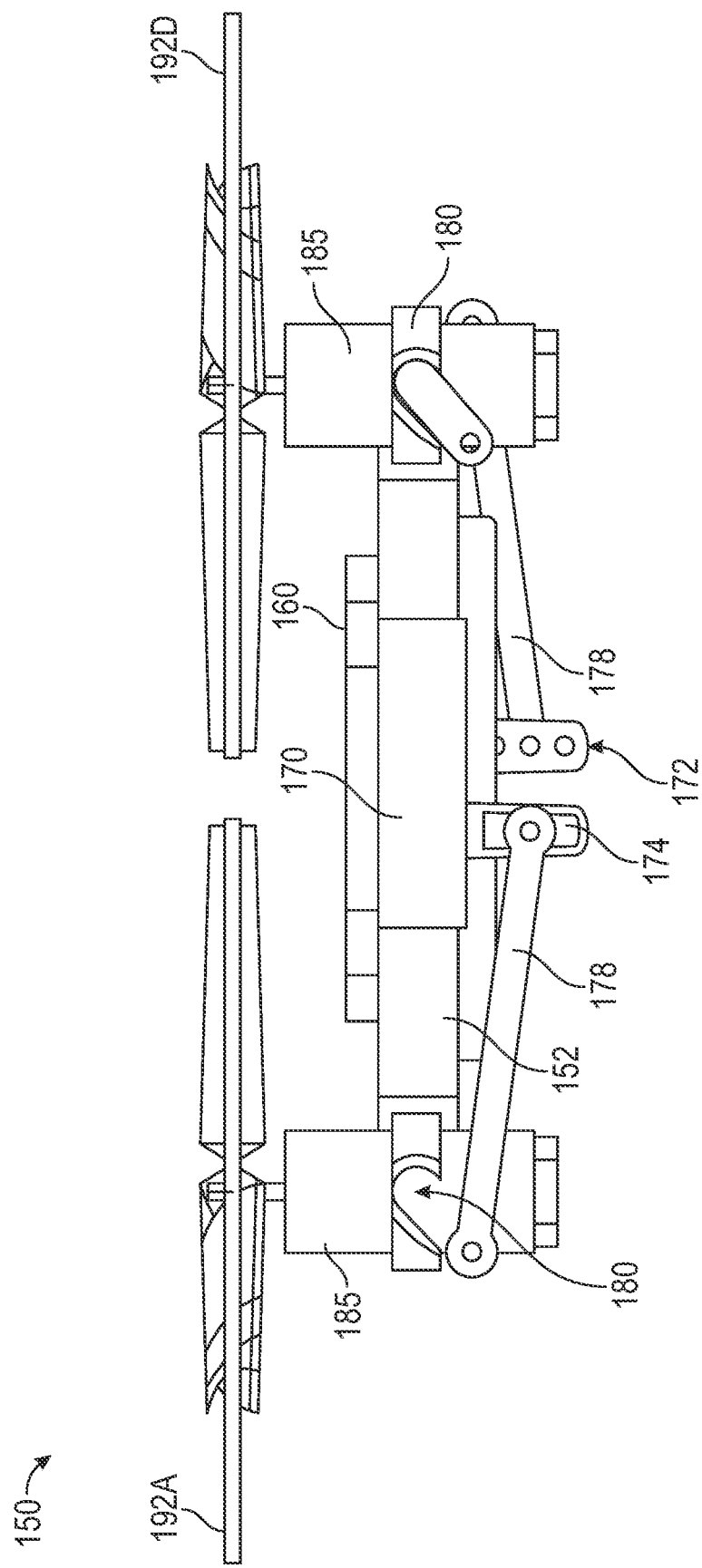
FIG. 4 is a front view of the MMV of FIG. 3 in the first mode of operation.
Figure 5:
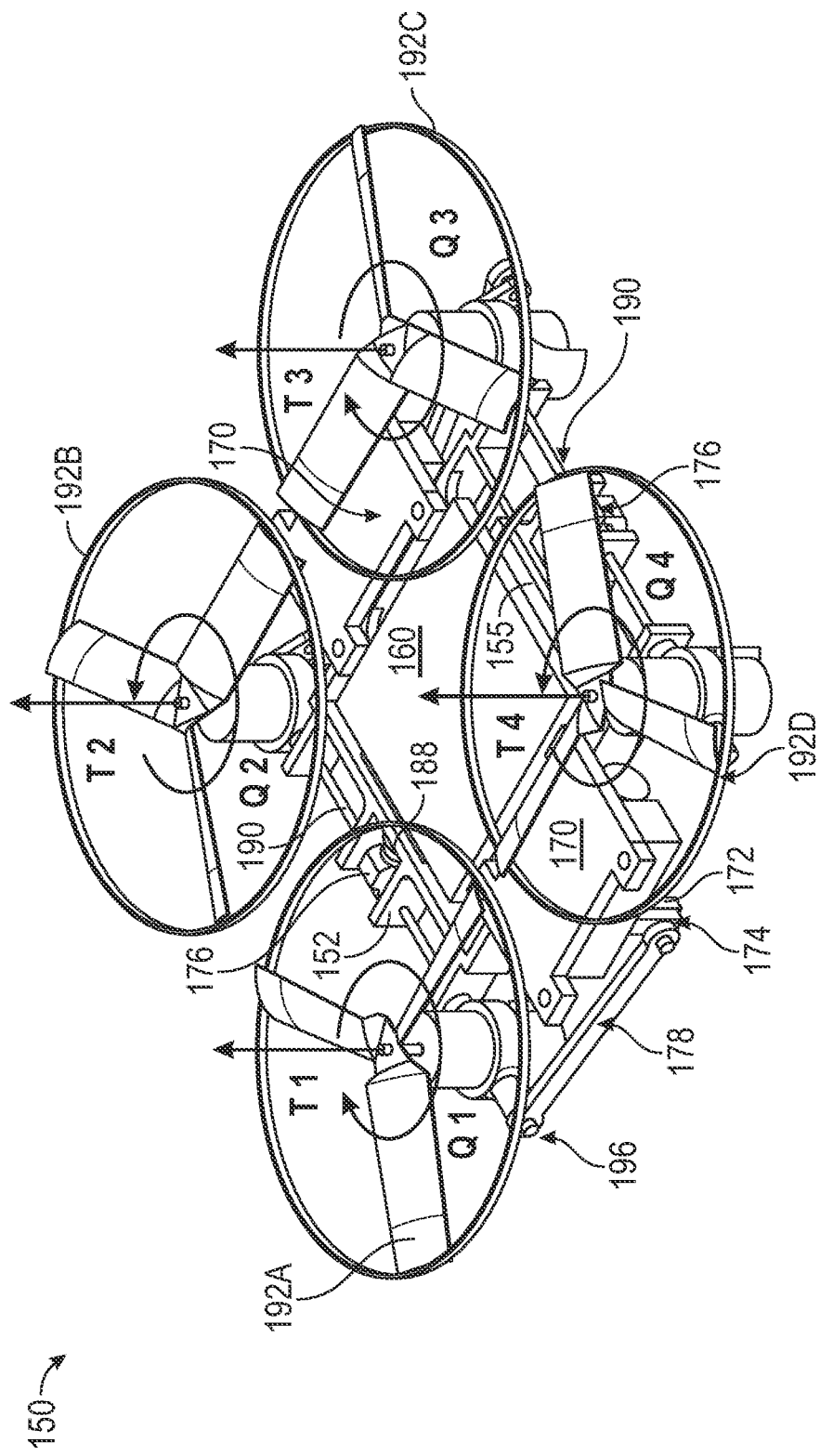
FIG. 5 is a perspective view of the MMV of FIG. 3 in the first mode of operation.
Figure 6:
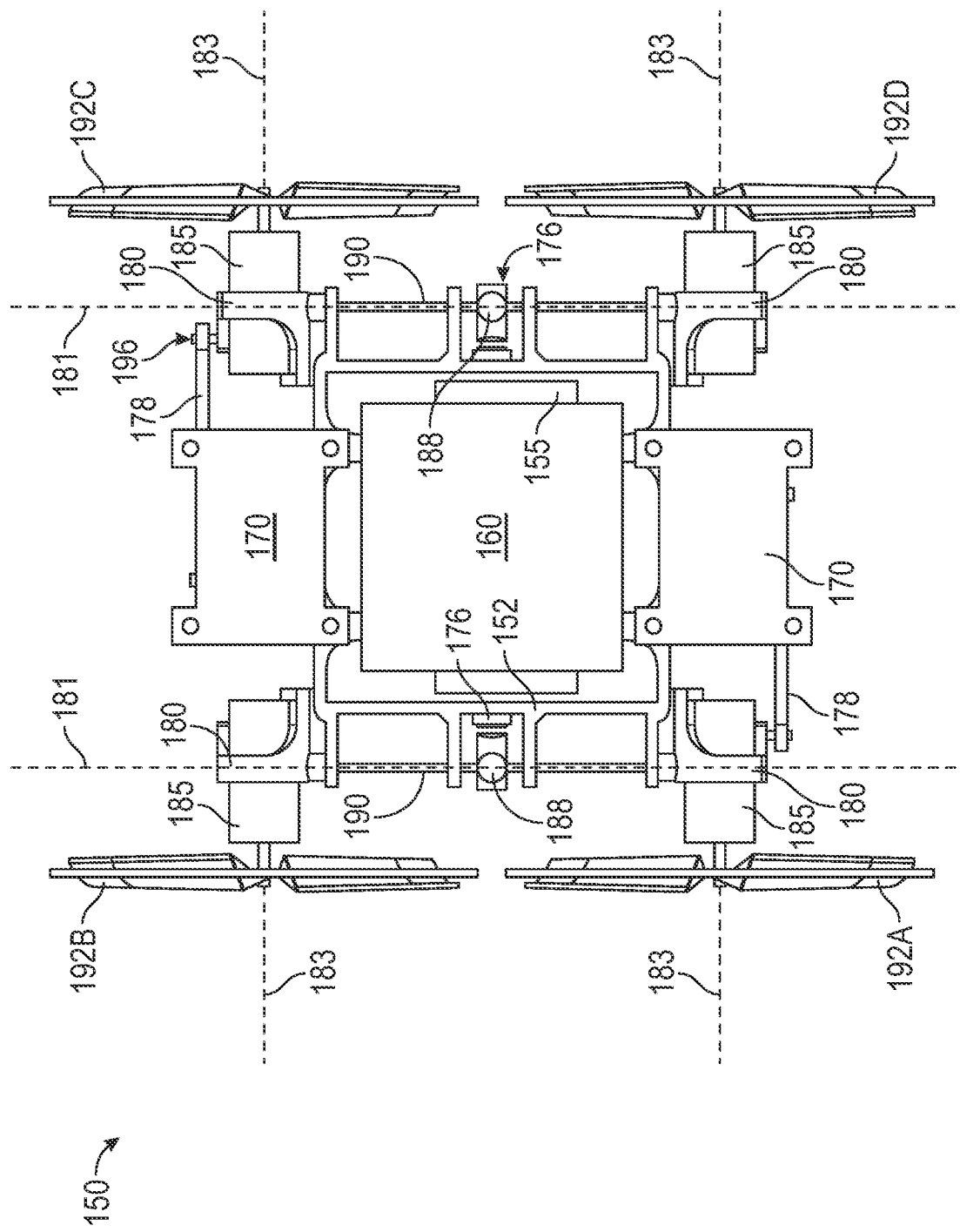
FIG. 6 is a top view of the MMV of FIG. 3 in a second mode of operation.
Figure 7:
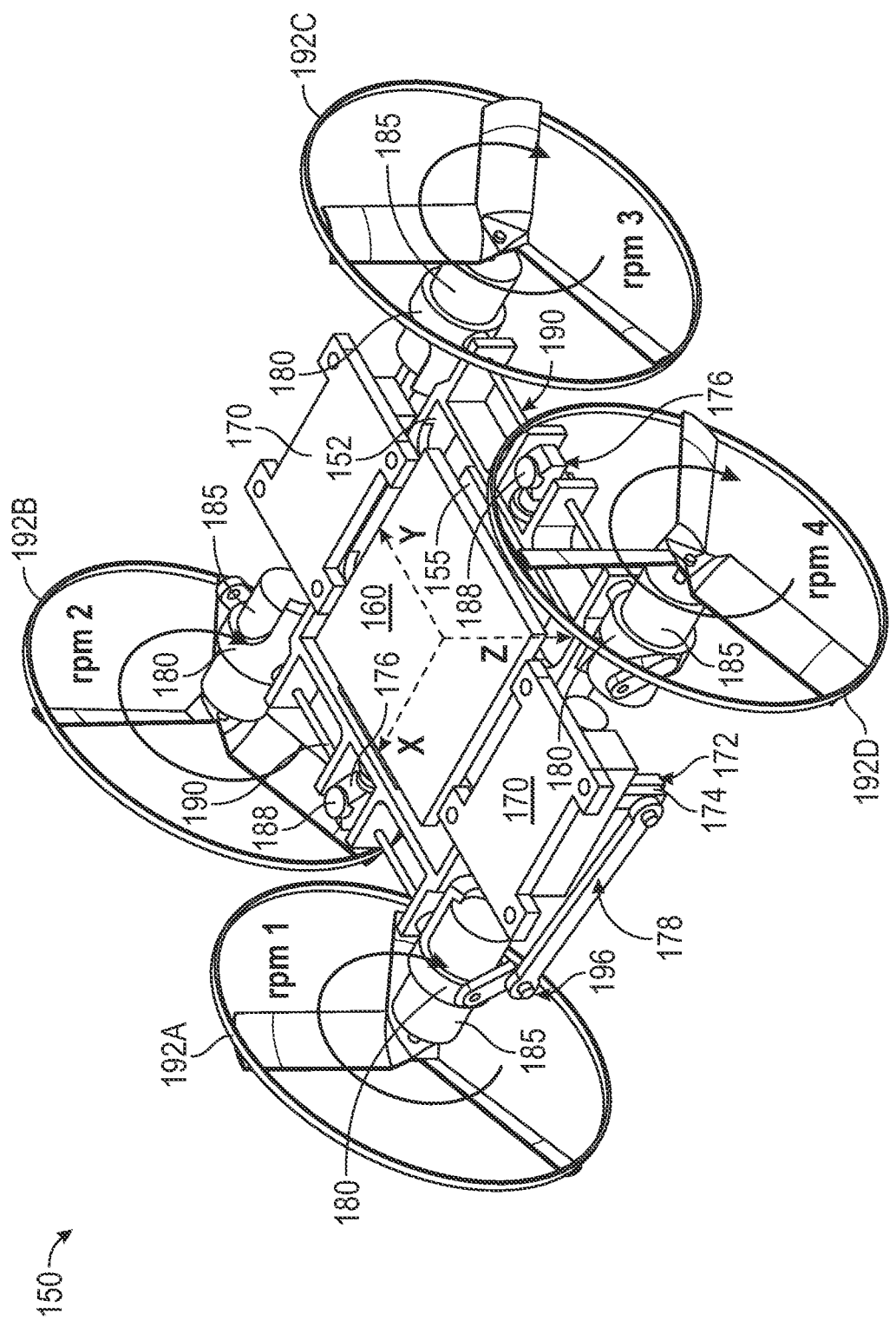
FIG. 7 is a perspective view of the MMV of FIG. 3 in the second mode of operation.

Referring to FIGS. 3-7, another embodiment of an MMV 150 is shown including a flight or aerial mode or configuration (FIGS. 3-5) and a ground or terrain mode or configuration (FIGS. 6, 7). In the embodiment of FIGS. 3-7, MMV 150 generally includes a frame or structure 152, a power supply or battery 155, a control system 160, a plurality of actuators or servos 170, a plurality of servo arms 172, a plurality of connecting links 174, a plurality of magnet holders 176, a plurality of actuator arms 178, a plurality of motor mounts 180, a plurality of motors (e.g., DC motors, etc.) 185, a plurality of magnets 188 supported by magnet holders 176, a plurality of carbon fiber shafts 190, a plurality of rotors or wheels (depending upon the mode of operation) 192, and a plurality of carbon fiber connecting rods 196. In this embodiment, MMV 1150 includes four rotors 192 that are each tiltable approximately 90 degrees for switching between aerial and ground modes of operation. For instance, each rotor 192 includes a plurality of circumferentially spaced propeller blades 193 (shown in FIG. 3) capable of creating lift sufficient for flying MMV 150 when rotors 192 are disposed in a lateral orientation as shown in FIGS. 3-5. Additionally, each rotor 192 comprises an outer rim or cover 195 coupled to a terminal end of each blade 193 for transporting MMV 150 on the ground when rotors 192 are disposed in a substantially vertical orientation (tilted approximately 90 degrees from the lateral orientation) shown in FIGS. 6, 7. In this embodiment, servos 170 are configured to actuate rotors 192 between their lateral and vertical orientations. The rotors 192, which are mounted on shafts 190 of MMV 150, rotate about a pair of first axes 181 (shown in FIG. 6) through which shafts 190 extend when rotors 192 are transitioned between the first and second positions, where the pair of first axes 181 are separate from a plurality of second axes 183 (shown in FIG. 6) about which rotors 192 rotate when actuated by their respective motors 185.

As shown in FIGS. 3-5, MMV 150 is configured to utilize rotors 192 (labeled as rotors 192A, 192B, 192C, and 192D in FIGS. 3-7) for flying in a manner similar to a quad-copter. In FIG. 5 the thrust produced by each rotor 192A-192D is denoted by T1, T2, T3, and T4, with thrust T1 corresponding to rotor 192A, thrust T2 corresponding to rotor 192B, etc. Additionally, in FIG. 5 the reaction torques of each of the rotors 192A-192D of MMV 150 are given by Q1, Q2, Q3, and Q4, with reaction torque Q1 corresponding to rotor 192A, reaction torque Q2 corresponding to rotor 192B, etc. In this embodiment, the total thrust produced by each rotor 192A-192D (e.g., the sum of T1-T4) equals the weight of MMV 150 while hovering above the ground and the sum of the reaction torques Q1-Q4 equals to substantially zero. The body-fixed coordinate system (X, Y, and Z-axes) are indicated in FIG. 3. Particularly, forward flight of MMV 150 corresponds to motion along the X-axis in FIGS. 3-7; rotation of MMV 150 about the X-axis is denoted as roll; rotation of MMV 150 about the Y-axis is denoted as pitch; and rotation of MMV 150 about the Z-axis is denoted as yaw.

As shown particularly in FIG. 5, diagonally opposite rotor pairs (i.e., rotor 192A/rotor 192C and rotor 192B/rotor 192D) rotate in the same direction so that the net moment about the Z-axis (yaw-moment) is at or near zero while MMV 150 flies. Also, in steady hover or forward flight (e.g., along the X-axis) the thrust vectors (T1, T2, T3, and T4) may be adjusted such that the net moments about the X-axis (roll moment) and the Y-axis (pitch moment) are equal or close to zero. Particularly, the magnitude of each thrust vector T1-T4 is varied by changing the rotational speed (rpm) of each individual rotor 192A-192D, respectively. The direction of thrust vectors T1-T4 may be changed by tilting MMV 150 (pitch or roll) and/or by tilting just rotors 192A-192D relative to the frame 152 of MMV 150 using servos 170. For example, in order to produce a nose-down pitching motion about the Y-axis, the rotational speed of rotors 192A and 192B is decreased and those of rotors 192C and 192D is increased. A nose-down pitch motion of MMV 150 also results in a forward translation of MMV 150 along X-axis. As another example, to produce a right roll motion of MMV 150 (clockwise in FIG. 4) about the X-axis, the rotational speed of rotors 192A and 192D is increased and the rotational speed of rotors 192B and 192C is decreased. A right roll motion also results in a sideward translation of MMV 150 along the Y-axis. As a further example, to generate a positive yawing motion of MMV 150 about the Z-axis, the rotational speed of rotors 192A and 192C is increased and the rotational speed of rotors 192B and 192D is decreased. Additionally, the yawing motion results in a change in heading angle of MMV 150. In this embodiment, onboard feedback control system 160 of MMV 150 is configured to keep MMV 150 stable in hover and forward flight. In some embodiments, in addition to the inner-loop feedback stabilization provided by control system 160, a pilot of MMV 150 can give higher level commands to fly and maneuver MMV 150 as desired. The ability to control MMV 150 by changing the magnitude of four thrust vectors may increase the agility of MMV 150 in flight.

As shown particularly in FIGS. 6, 7, to transport MMV 150 over the ground in the ground locomotion mode, servos 170 of MMV 150 tilt the four rotors 192A-192D such that they can be used as wheels (via outer rims 195 of rotors 192A-192D) for transporting MMV 150 along a surface. In this embodiment, a tilting mechanism of MMV 150 uses a linkage system comprising arms 172, 174, and 178, along with servos 170 (e.g., linear or rotary servos) to tilt rotors 192A-192D and actuate MMV 150 from the flying mode shown in FIGS. 3-5 to the ground mode shown in FIGS. 6, 7. Since the four wheels or rotors 192A-192D are actuated by four independent motors 185, respectively, differential rotational speed may be used to steer MMV 150 when MMV 150 is in the ground mode. As described above, in the flying mode of MMV 150, adjacent rotors 192A-192D may be rotated in opposite rotational directions for steering MMV 150. For instance, rotor 192A may be rotated in the opposite direction of rotor 192B, and rotors 192C and 192D rotated in the opposite directions as well. In this manner, MMV 150 produces a zero yaw moment. However, in the ground mode of MMV 150, adjacent rotors 192A-192D generally rotate in the same rotational direction to move MMV 150 forward or backward (e.g., forward and backward along the Y-axis). Therefore, the controllers of control system 160 for controlling motors 185 have bi-directional motor control capability.

When steering MMV 150 on the ground, the rotational speed of rotors 192A-192D on one side (e.g., rotors 192A and 192B, for example) may be increased while the rotational speed of the rotors on the opposing side (e.g., rotors 192C and 192D, for example) may be decreased. For example, to turn MMV 150 to the right in the orientation shown in FIGS. 6, 7 (the side of MMV 150 proximal rotors 192C, 192D), the rotational speed of rotors 192A and 192B may be increased while the rotational speed of rotors 192C and 192D is decreased. As another example, MMV 150 may make a full, 360 degree turn while remaining stationary by rotating rotors 192A and 192B in one rotational direction and rotors 192C and 192D in the opposing rotational direction. The ability to use differential rotational speed for steering MMV 150 may improve the agility of MMV 150 when operating in the ground mode. Moreover, when faced by an obstacle rotors 192A-192D cannot negotiate, MMV 150 may transform to the aerial or flying mode shown in FIGS. 3-5 and thereby fly above and over the obstacle, improving the utility of MMV 150 in at least some applications.

Figure 8:
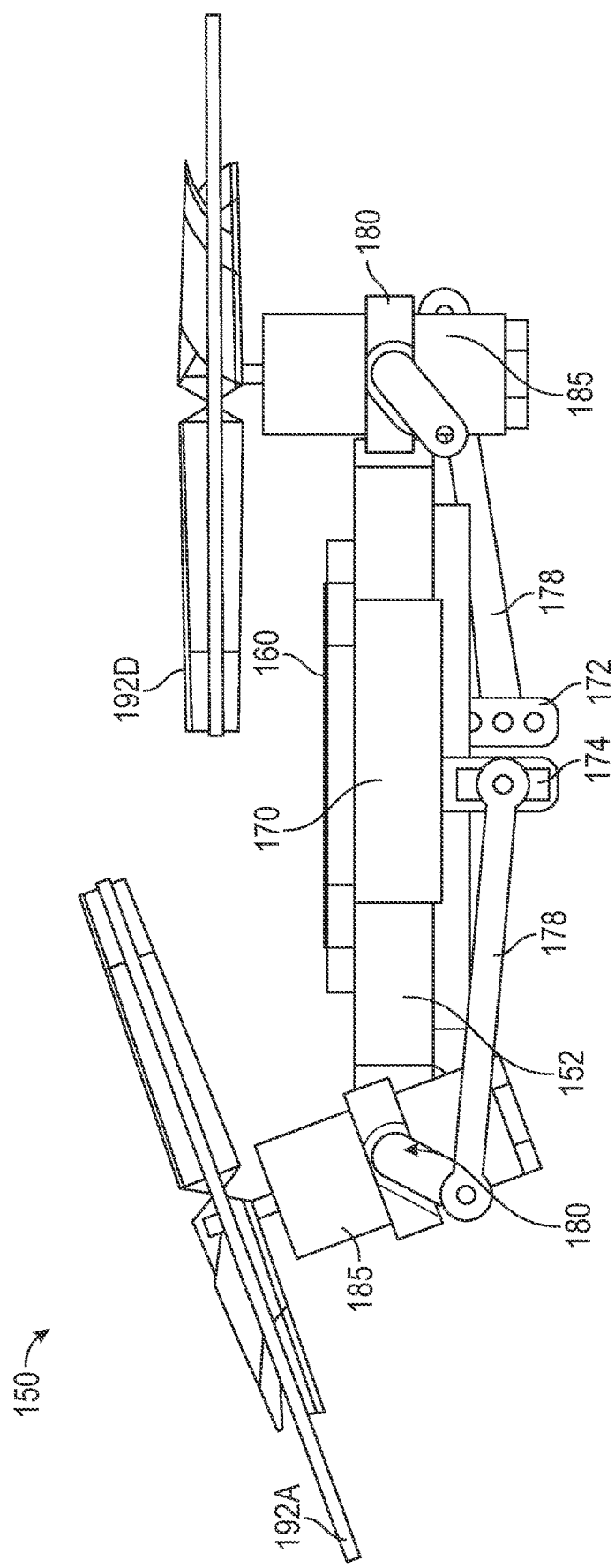
FIG. 8 is a front view of the MMV of FIG. 3 in a two-rotor tilt configuration.
Figure 9:
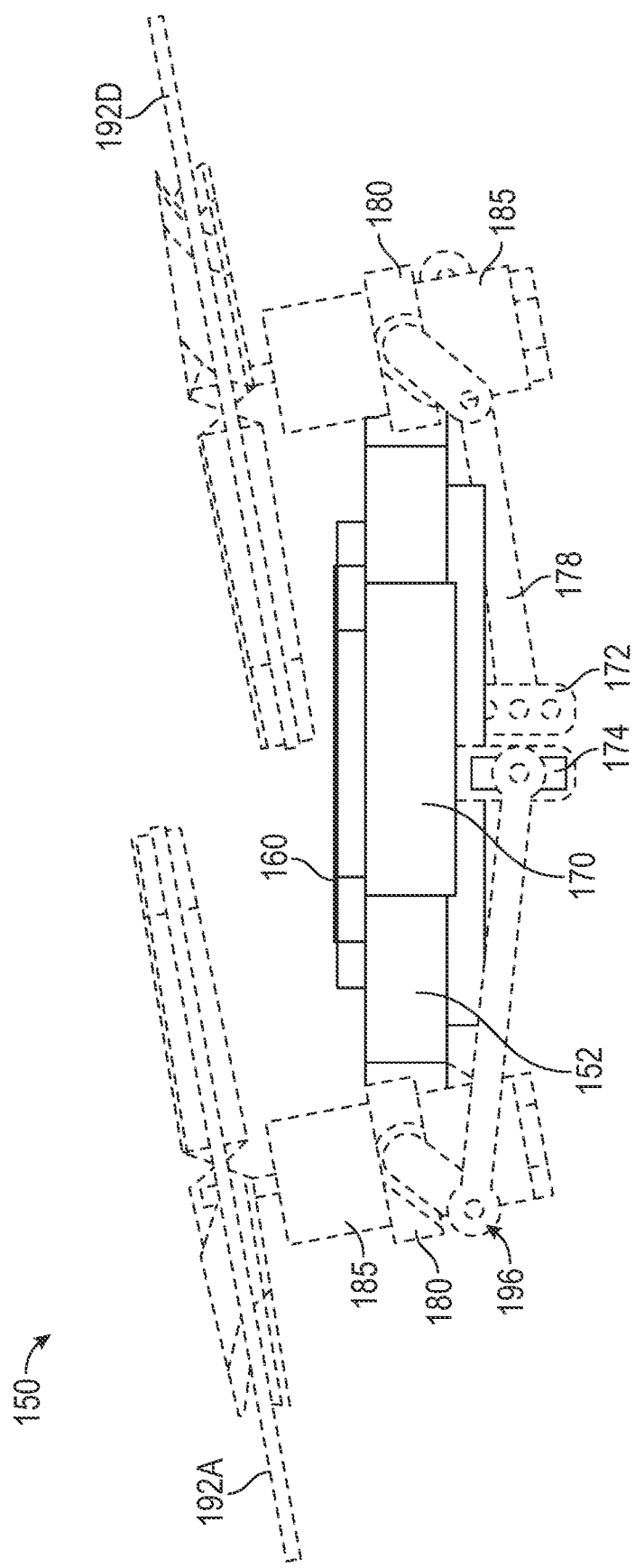
FIG. 9 is a front view of the MMV of FIG. 3 in a four-rotor tilt configuration.

Referring to FIGS. 8, 9, another capability of MMV 150 when MMV 150 is in the flying mode of operation is the ability to fly forward (e.g., along the X-axis) without tilting frame 152 forward (e.g., without tiling frame 152 about the X-axis), unlike a conventional quad-copter. For instance, in some applications, a conventional quad-copter may tilt the whole body of the quad-copter forward in order to fly forward, thereby making the vehicle pitch a function of the forward speed. Therefore, if there is a downward pointing camera attached to the conventional quad-copter, to the camera must be tilted using an active gimbal to keep the camera oriented downward independent of the speed of the conventional quad-copter. However, MMV 150 may fly forward at relatively high speeds by tilting only two rotors 192A-192D (shown in FIG. 8) or each of rotors 192A-192D (shown in FIG. 9) forward, while frame 152 of MMV 150 remains horizontal relative to the ground. In other embodiments, rotors 192A-192D may be attached to fixed wings mounted to frame 152, rotors 192A-192D being pivotable about axes parallel with the X-axis shown in FIG. 3 to provide forward thrust (in the direction of the Y-axis shown in FIG. 3) for high speed flight.

In some embodiments, including embodiments at larger scales, MMV 150 may include a gearbox, such as a two or multiple speed gearbox, to increase the rotational speed of rotors 192A-192D when MMV 150 is in the flying mode while lowering the rotational speed of rotors 192A-192D when MMV 150 is in the ground mode. Additionally, the inclusion of a gearbox allows motors 185 of MMV 150 to provide sufficient torque to rotors 192A-192D while also maintaining optimal efficiency in both flying and ground modes. In some embodiments, the power required for ground locomotion of MMV 150 may only comprise a fraction of the power required for the flying mode of MMV 150. Although in this embodiment rims 195 are each coupled to the blades 193 of a corresponding rotor 192A-192D, in a further embodiment, rims 195 may comprise shrouds or ducts 195 that do not rotate in concert with blades 193 about second axes 183 when MMV 150 is in the flying mode. Particularly, in this further embodiment, shrouds 195 act as wheels when MMV 150 is in the ground mode, but when MMV 150 is transitioned to the flying mode, blades 193 rotate relative shrouds 195 which remain stationary with respect to second axes 183, thereby reducing the drag of rotors 192A-192D during flight while also increasing the flying efficiency (thrust/power) of the MMV 150. Shrouds 195 may also increase the safety of operating MMV 150 by shielding blades 193, which may be beneficial in larger scale applications where MMV 150 is configured for transporting human passengers. In this further embodiment, a transmission or clutch may be used to permit relative rotation between shrouds 195 and the blades 193 of rotors 192A-192D when the MMV 150 is in the flying mode.

Figure 10:
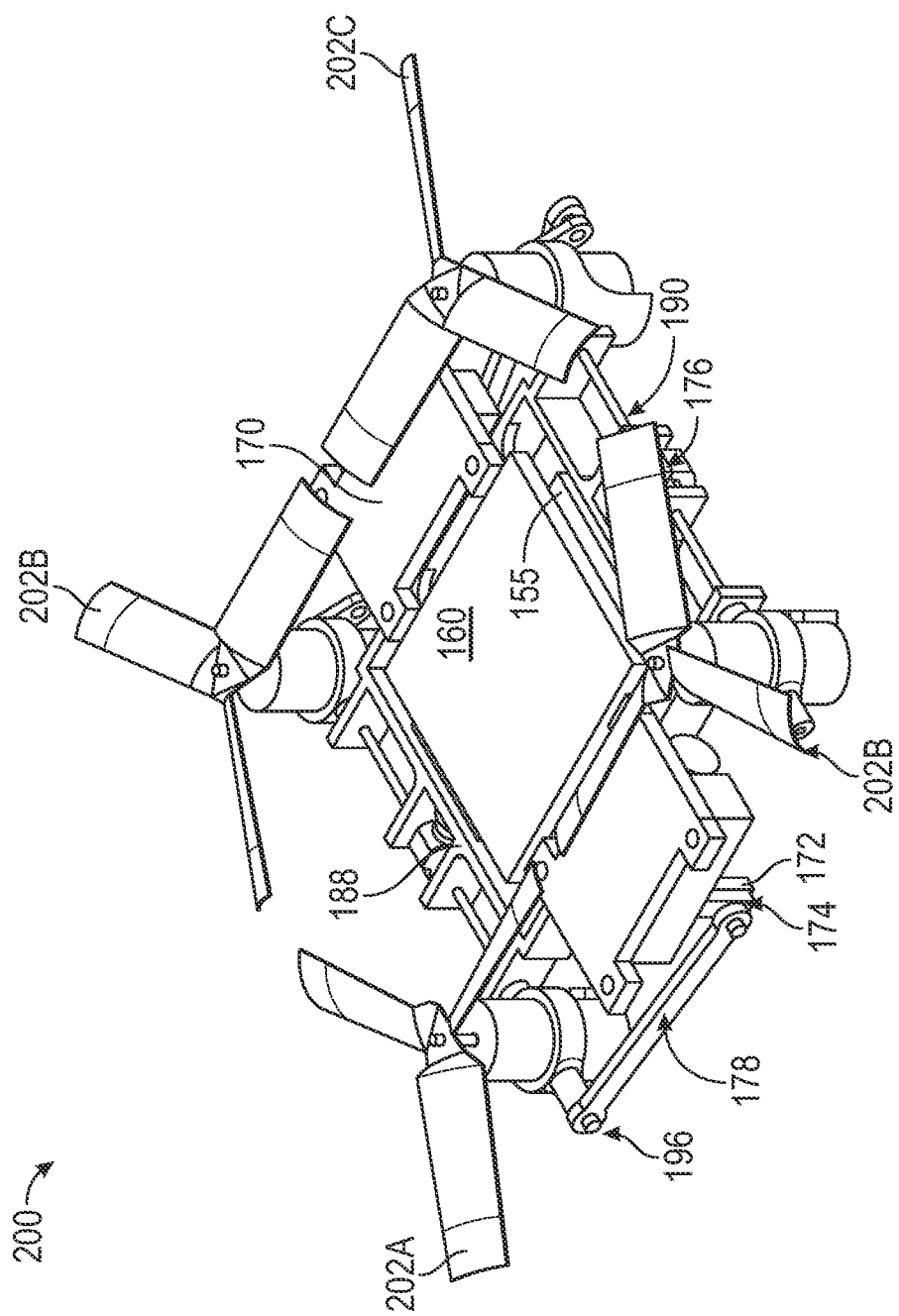
FIG. 10 is a perspective view of another embodiment of an MMV in a first mode of operation in accordance with the principles disclosed herein.
Figure 11:
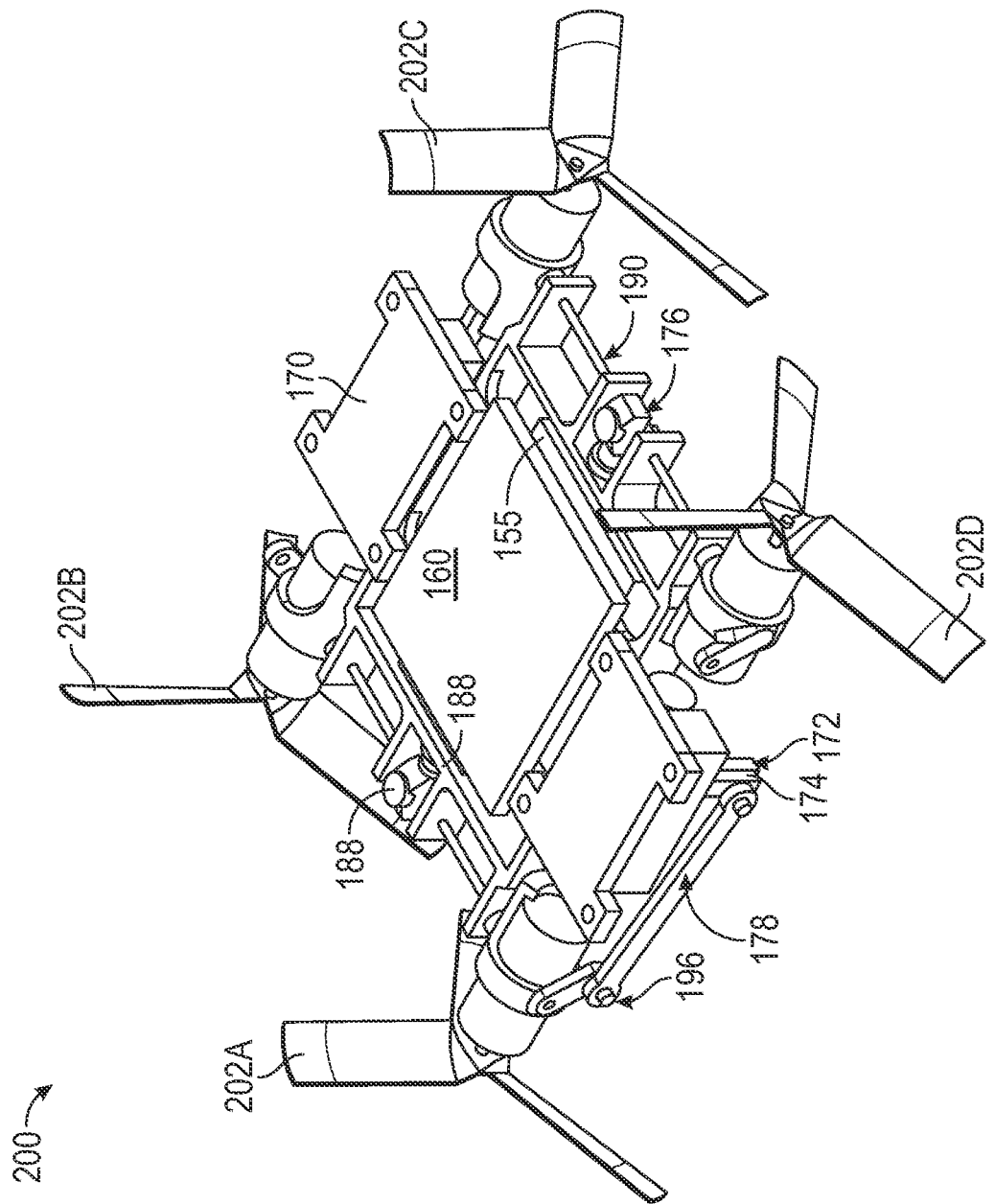
FIG. 11 is a perspective view of the MMV of FIG. 10 in a second mode of operation.

Referring briefly to FIGS. 10, 11, another embodiment of an MMV 200 is shown. Particularly, MMV 200 is shown in a flying or aerial mode in FIG. 10 and in a ground or terrain mode in FIG. 11. MMV 200 is similar to MMV 150 described above, and shared features are labeled similarly. However, unlike MMV 150 described above, MMV 200 includes rotors or wheels 202A-202D which do not include an outer rim or ring (e.g., rims 195 of rotors 192A-192D shown in FIG. 3). Moreover, the present disclosure encompasses MMV embodiments having rotors with any number of blades and that may operate with or without an outer rim. In some applications, including more blades per rotor without an outer surrounding rim may improve the mobility of MMV 200 on highly uneven and loose terrain (e.g., grass, sand, etc.) and extremely smooth surfaces.

Figure 12:
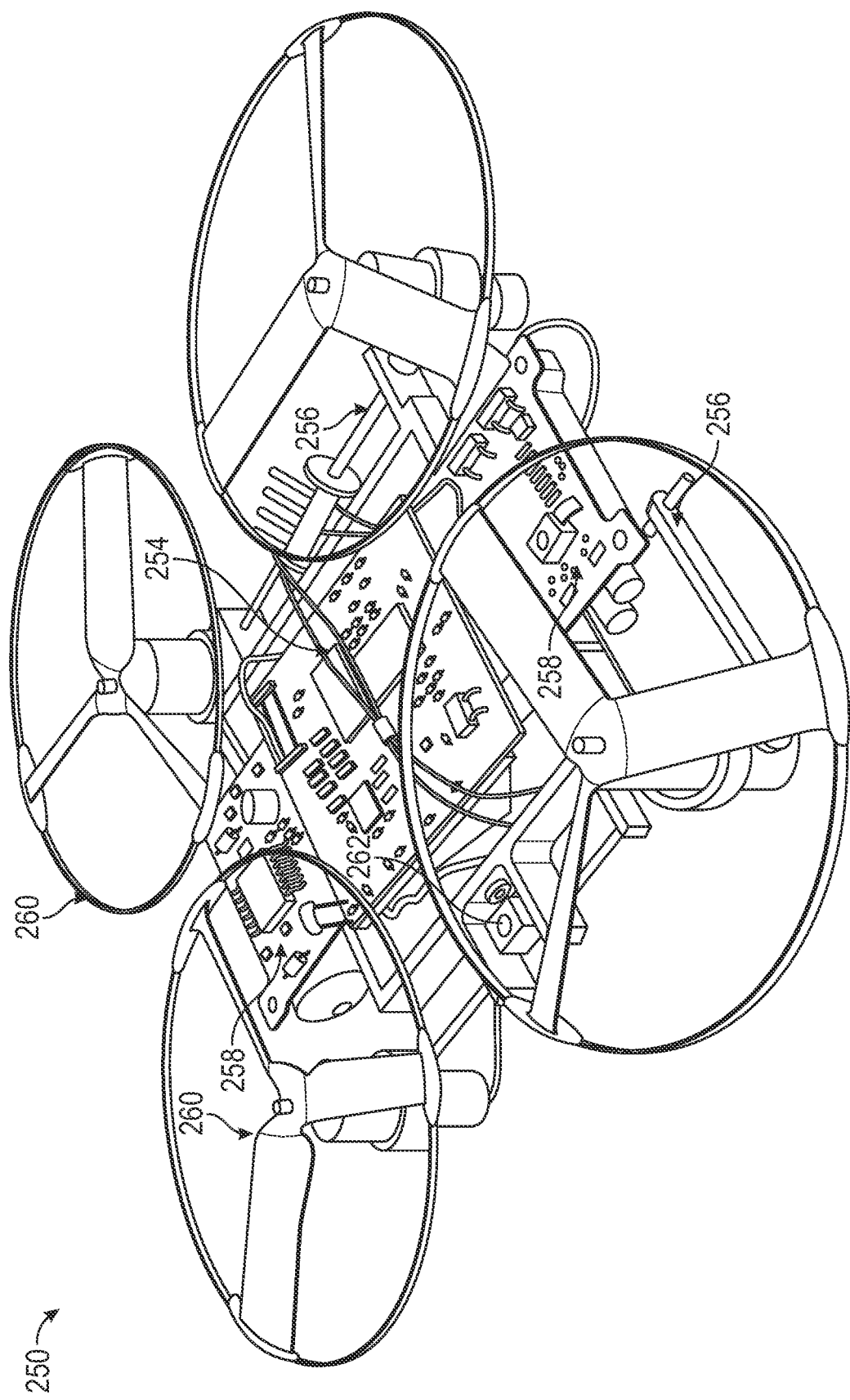
FIG. 12 is a perspective view of an embodiment of an MMV prototype in a first mode of operation in accordance with the principles disclosed herein.
Figure 13:
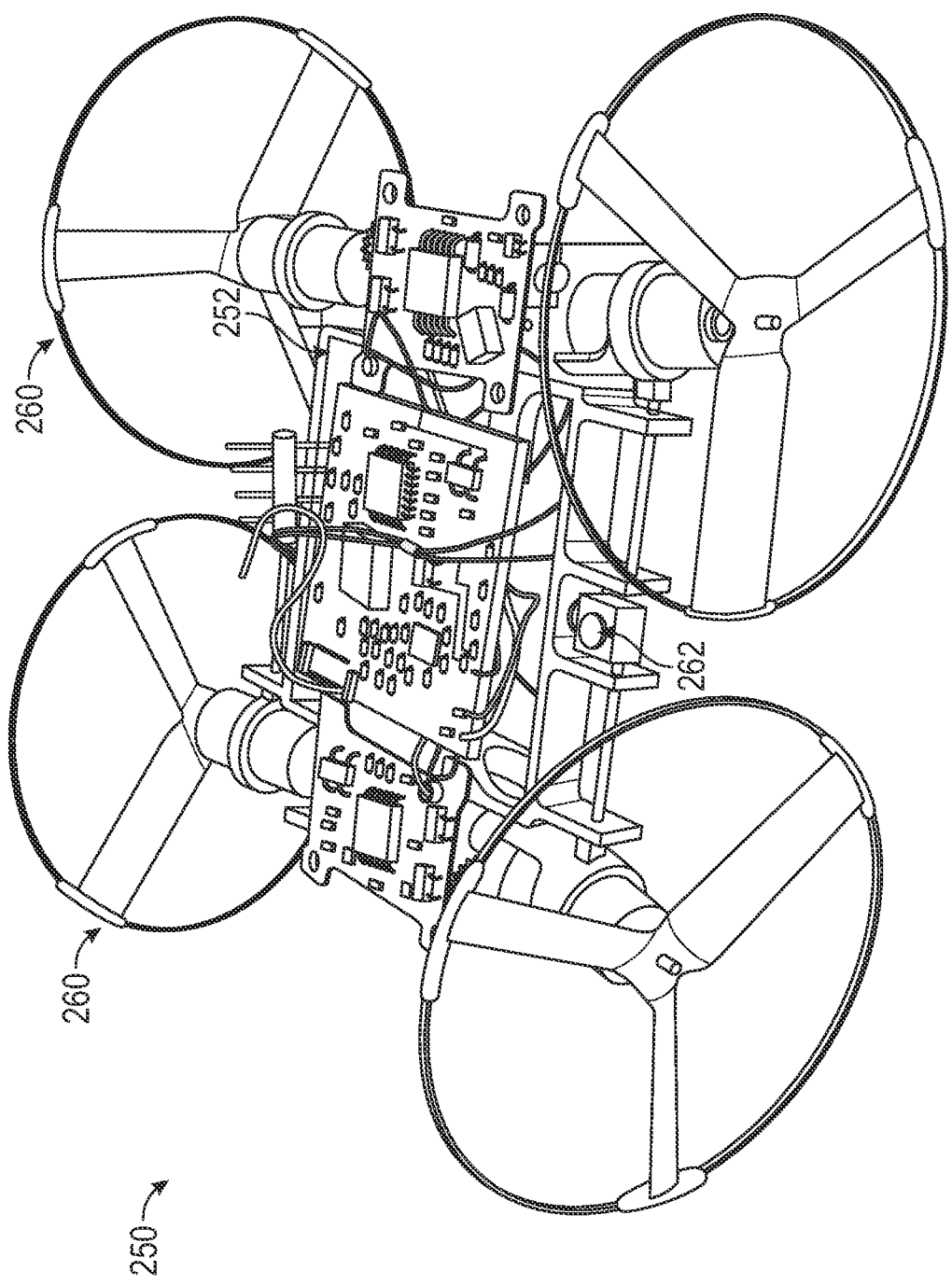
FIG. 13 is a perspective view of the MMV prototype of FIG. 12 in a second mode of operation.

Referring to FIGS. 12, 13, an embodiment of a MMV prototype or technology demonstrator 250 of the MMV 150 of FIGS. 3-9 is shown. MMV prototype 250 generally includes a support structure or frame 252, a control board or system 254, a pair of rotor or wheel tilting mechanisms 256, a pair of linear servos or actuators 258, a plurality of rotors or wheels 260, and a pair of bi-stable, magnetic locking mechanisms 262. In the embodiment of FIGS. 12, 13, MMV prototype 250 weighs approximately 16 grams and includes 3-bladed rotors 260 with a diameter of approximately 1.2 inches; however, in other embodiments, the length and number of blades per rotor 260 may vary. In this embodiment, the rotors 260 of MMV 250 are made out of carbon fiber using a unique fabrication process, as will be discussed further herein, and are capable of producing the required thrust for hover of MMV prototype 250. Rotors 260 are optimized for hover at ultra-low Reynolds numbers through rigorous experimental parametric studies.

In this embodiment, the rotor molds used for fabricating rotors 260 of MMV 250 are made in two parts from Polytetrafluoroethylene (PTFE), where the rim of each rotor 260 is made from a separate mold. In this embodiment, a carbon fiber prepreg is used for fabricating rotors 260 given that the prepreg may be easily formed and also has a relatively high strength to weight ratio. The rim mold for each rotor 260 is milled from aluminum in three parts. Particularly, the first part of the rim mold for each rotor 260 is a disk, the second is a similar disk with a groove cut around the top surface, and the third part is a made of two sub-parts that secure the carbon fiber in the mold. In this embodiment, the blade mold for each rotor 260 is machined from approximately ⅜" PTFE and is refined using a milling machine operated by software in accordance with a CAD model of the rotor 260. Specifically, the milling machine starts by performing a low resolution cut followed by a finishing toolpath, which smooths the mold into the desired shape. In this embodiment, after the blade molds for each rotor 260 are milled, the surfaces of the blade molds are smoothened using a utility knife, and a notch is added to a corner to allow the blade mold released.

An embodiment for a process of making the propeller or rotor (e.g., rotors 120, 192, 260, etc.) with the outer ring includes placing two disks of the ring mold together with channel in the middle, and securing the mold with a nut and bolt. The process additionally includes cutting unidirectional carbon fiber prepreg the length of the circumference of the ring plus approximately five millimeters (mm) in the directions of the fibers and with a width of approximately 0.75 mm, tightly wrapping the carbon fiber around the channel of the mold and pressing the ends of the strip together. The process further includes sliding the outer parts of the mold into the channel and clamping both halves together to ensure uniform thickness of the ring. In addition, the process includes placing the mold in an oven at approximately 350° F. for approximately 30 minutes, and removing the mold from the oven to allow the mold to cool. After cooling, the process further includes loosening the nut and separating the disks of the mold to remove the ring.

The process additionally includes cutting the carbon prepreg fabric in the right shape, pressing the prepreg into the male half of the propeller or rotor mold, ensuring that the prepreg is centered in the mold with approximately four to five mm of length at the end of each blade of the rotor. In addition, the process includes placing the ring into the bottom of the ring support in the mold, one blade at a time, folding excess length of the prepreg over the ring and securing it to the inside of the blade. After the prepreg is secured, the process further includes mating the female part of the mold to the male part, and fixing the mold between two aluminum plates with a clamp. Further, the process includes placing the mold into an oven at approximately 350° F. for 90 minutes, removing the mold from the oven and allowing the mold to cool, and sliding a utility knife or another flat tool between the mold halves to release the propeller or rotor. Once the rotor is separated from the mold, the rotor may be finished by removing excess material, boring the center of the rotor and glue the hub in place, placing the rotor on a balancing stand and removing material from the center or ring attachment point until the rotor is balanced, and sharpening the upper and lower surfaces of the leading edges of the blades to improve performance of the rotor. Although a method or process for fabricating a rotor comprising circumferentially spaced blades and a surrounding rim is described above, rotors for MMVs, such as MMV 150 or MMV prototype 250 may be fabricated using a variety of methods or processes.

Figure 14:
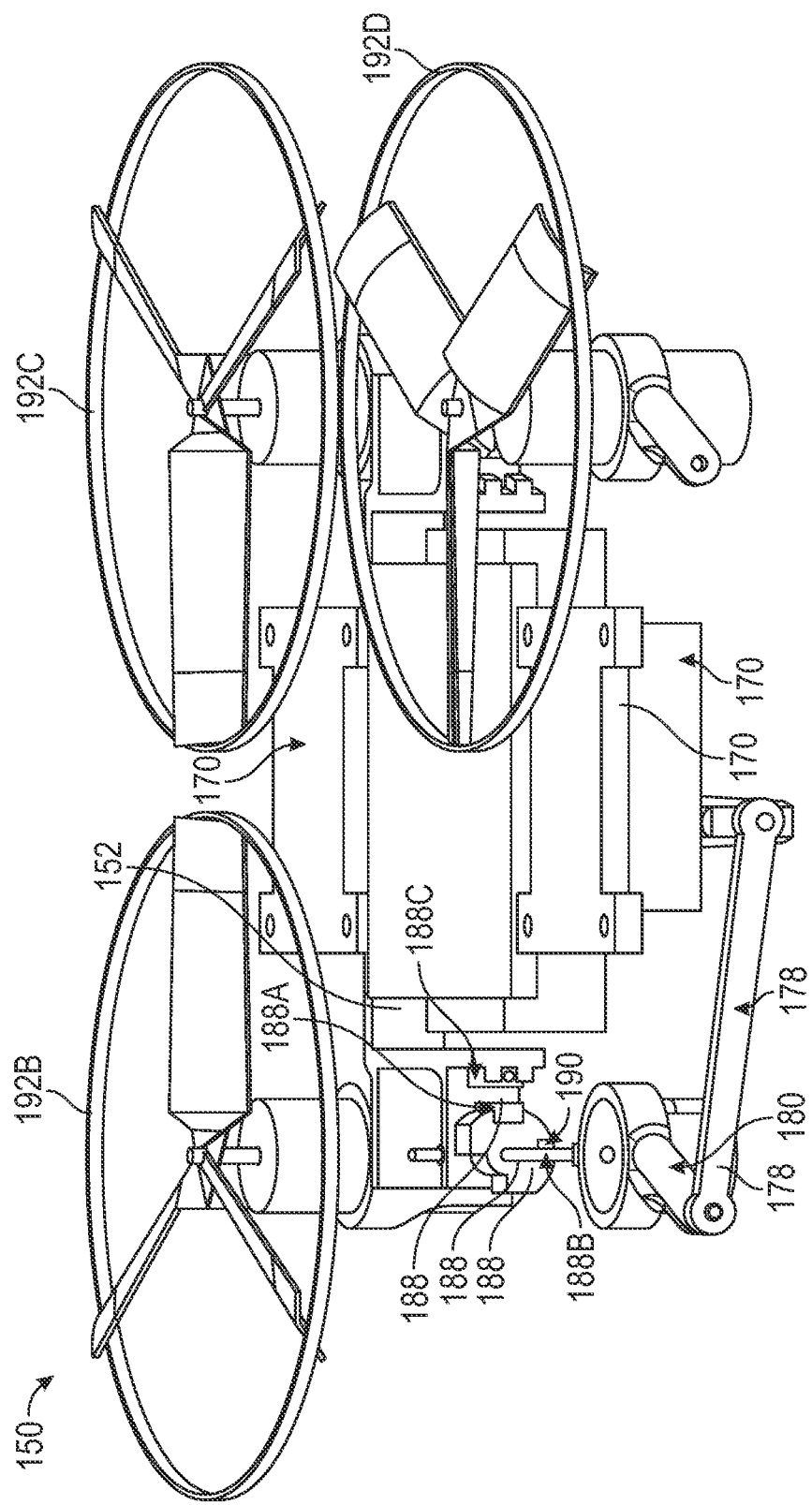
FIG. 14 is a perspective view of a linkage system of the MMV of FIG. 3 in the first mode of operation.
Figure 15:
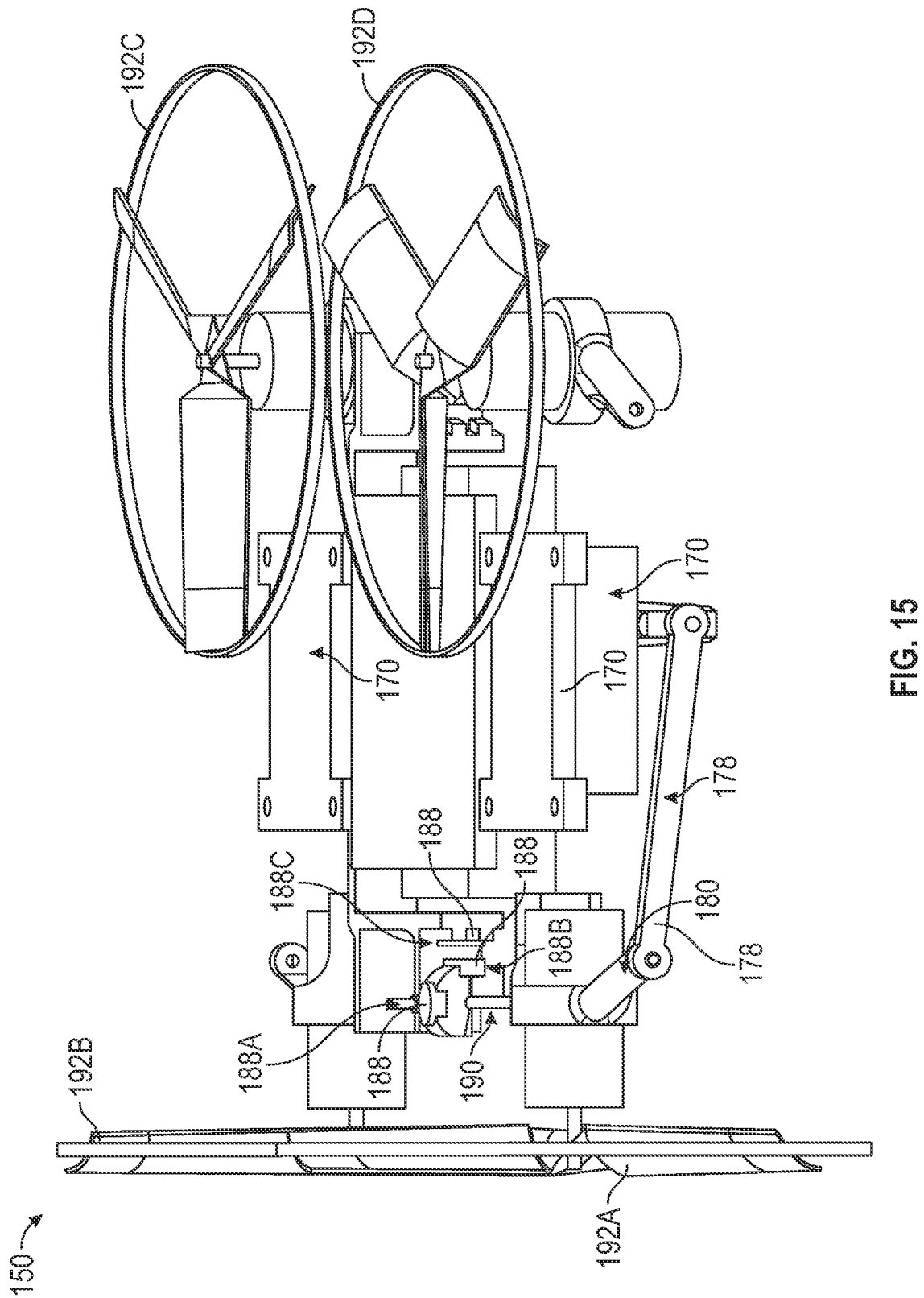
FIG. 15 is a perspective view of the linkage system of the MMV of FIG. 3 in the second mode of operation.

Referring to FIGS. 14, 15, the tilting mechanism of MMV 150 shown in FIGS. 3-9 is shown in greater detail in FIGS. 14, 15. In the embodiment of FIGS. 3-9, 14, and 15, the tiling mechanism of MMV 150 comprises a linkage system with a bi-stable locking mechanism (stabilized via magnets) to lock rotors 192A-192D in either vertical (flying mode) or horizontal (ground mode) positions or orientations so that servos 170 may be powered down once the transformation between the flying and ground modes of MMV 150 is complete. In other words, due to the bi-stable locking mechanism of the tilting mechanism of MMV 150, servos 170 need only be powered when MMV 150 is transitioning between the flying and ground modes. In this embodiment, the mechanism is driven using an approximately 1.5 gram micro-linear servo 170; however, in other embodiments, MMV 150 may use a variety of servo actuators for actuating rotors 192A-192D between vertical and horizontal positions.

In this embodiment, MMV 150 includes a pair of bi-stable locking mechanisms for locking rotors 192A-192D into the vertical or horizontal positions, where each bi-stable locking mechanism is associated with a pair of rotors 192 (e.g., rotors 192A and 192B, for example). As shown particularly in FIG. 14, when rotors 192A-192D are in the vertical position (relative to the ground) a first magnet 188A of the bi-stable mechanism that is coupled to or mounted on a shaft 190 is attracted by a third magnet 188C coupled to or mounted on frame 152, thereby holding rotors 192A-192D in the vertical position. Then, while transitioning from the vertical position to the horizontal position, servos 170 apply a torque to each shaft 190 through the linkage system comprising arms 174, 176, and 178, which releases first magnet 188A from the magnetic field of third magnet 188C, and rotates shafts 190 until a second magnet 188B coupled to or mounted on shaft 190 is positioned adjacent third magnetic 188C and is thereby attracted by third magnet 188C to hold or lock rotors 192A-192D in the horizontal orientation shown in FIG. 15. This forms a bi-stable mechanism, where first magnet 188A is attracted by third magnet 188C in one stable state (rotors 192A-192D positioned vertically), and second magnet 188B attracts third magnet 188C in the other stable state (rotors 192A-192D positioned horizontally). Thus, first magnet 188A and second magnetic 188B, each coupled to a shaft 190 of MMV 150, are rotatable relative to third magnet 188C, which is stationary relative to the frame 152 of MMV 150. With the bi-stable locking mechanism, servos 170 may be powered down when not actuating between the flying and ground modes, saving onboard power of MMV 150. In this embodiment, there are two servos 170, each servo 170 tilting a pair of rotors 192A-192D.

Figure 16:
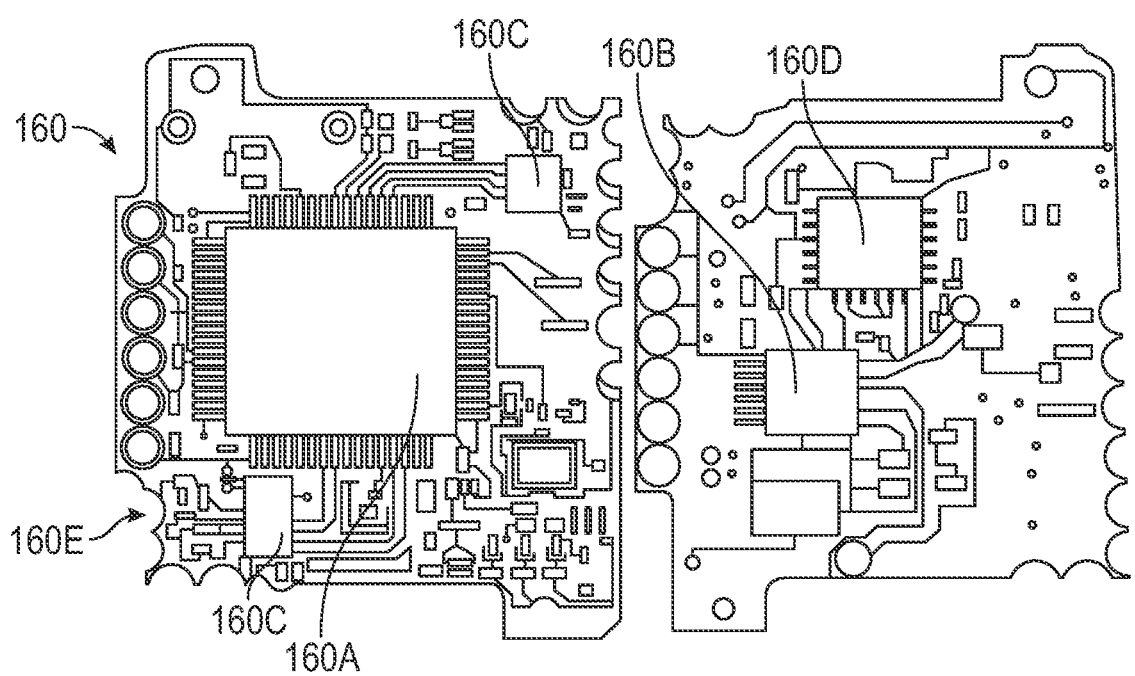
FIG. 16 is an embodiment of a control system of the MMV of FIG. 3 in accordance with the principles disclosed herein.

Referring to FIG. 16, an embodiment of control system or kinematic autopilot 160 of MMV 150 is shown. To assist with controlling and stabilizing MMV 150, control system 160 is generally configured to reduce the weight fraction of the autopilot and avionics units so as to maximize the payload capability and endurance of MMV 150. In this embodiment, control system 160 employs a microprocessor, sensors and speed controllers to achieve a relatively light-weight design with low power and low weight specifications to minimize the structural weight of MMV 150.

Figure 17:
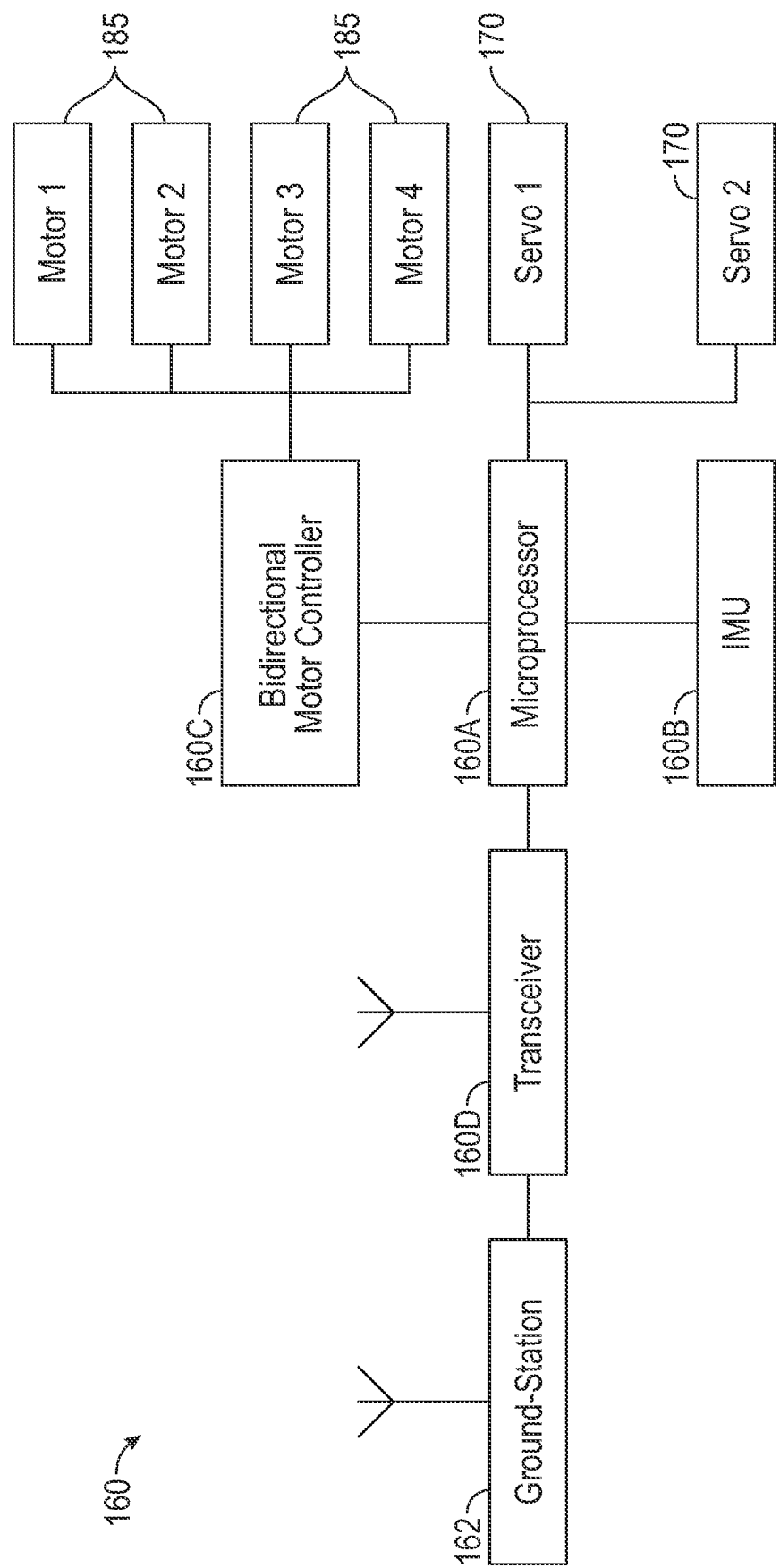
FIG. 17 is a schematic illustrating transfer of control information of the control system of FIG. 16.

In the embodiment of FIGS. 16, 17, control system 160 generally comprises a microprocessor or microcontroller unit 160A, an inertial measurement unit (IMU) 160B, a speed or motor controller unit 160C, a wireless transceiver 160D, and pinouts 160E comprising solder points for transferring commands to motors and servos. A schematic illustrating the transfer of information between the components of control system 160 is shown in FIG. 17. For high power density applications, such as applications of MMV 150, the microcontroller unit 160A of control system 160 operates continuously while performing complex calculations (e.g., Kalman filtering and gradient descent attitude estimation, etc.). Microcontroller unit 160A also simultaneously provides actuator control inputs at high stabilization rates. Microcontroller unit 160A is generally configured to read IMU data from IMU 160B, and transfer control commands to speed controller 160C, which is in signal communication with the motors 185 of MMV 150, as shown particularly in FIG. 17. In this embodiment, microcontroller unit 160A comprises a 32-bit ARM Cortex M4 processor that utilizes less than approximately 70 milliamps (mA) of current to operate, and comprises a clock speed of approximately 170 megahertz (MHz) that can service a number of peripherals and can be extended for other sensors and actuators while providing control inputs at approximately 1,000 hertz (Hz).

In this embodiment, IMU 160B is generally configured to measure rotational information of MMV 150 and comprises a nine degree-of-freedom system that includes a three-axis accelerometer, a three-axis gyroscope, and a three-axis magnetometer. IMU 160B exhibits internal temperature compensation and has minimal drift in gyroscope measurement as well as low noise characteristics. In this embodiment, attitude estimation and feedback control are carried out using gyro and accelerometer measurements alone. If demanded by a particular application, the magnetometer measurements performed by IMU 160B may be used as well in other embodiments.

Speed controller 160C of control system 160 is generally configured to convert control commands from microcontroller 160A to motor speed and reverses motor direction when desired. In this embodiment speed controller 160C comprises a field effect transistor, diodes, resistors and capacitors packaged into a compact unit that can continuously output upward of approximately 1.5 amps (A) to each motor 185 of MMV 150. In this embodiment, the avionics unit of MMV 150 comprises two speed controller units 160C with each unit 160C servicing two motors (e.g., motors 185). In this arrangement, the voltage polarity of the motor 185 leads may be conveniently switched in response to a digital signal from the microcontroller 160A of control system 160, thereby providing the bi-directional capability for the operation of MMV 150.

Transceiver 160D of control system 160 is generally configured to receive pilot commands and transmit vehicle flight information for data logging. For instance, transceiver 160D may accept wireless inputs from a remote ground station 162 (shown in FIG. 17) as well as transfer sensor information for data logging. In this embodiment, transceiver 160D comprises a 2.4 gigahertz (GHz) wireless transceiver that supports up to approximately 250 kilobits per second (kbps) of air data rate while consuming less than approximately 20 mA of current. Additionally, in this embodiment, transceiver 160D of control system 160 includes a surface mount chip antenna with a gain of approximately −0.5 decibels isotropic (dBi) to conserve space and to minimize losses. Further, in in this embodiment, control system 160 includes a power regulator or switching voltage regulator to provide over-voltage protection and to supply approximately 3.3 volts (V) to the various hardware units. The power regulator of this embodiment of control system 160 may accept input voltages of up to approximately 17 V with sufficient current output capability. In this embodiment, microcontroller 160A has several general purpose input-output (GPIO) pins and each of the devices of control system 160 communicate using specific GPIO pins assigned to them. Additionally, in this embodiment, the IMU 160B, speed controller 160C and wireless transceiver 160D talk with the microprocessor through inter-integrated circuit, timers and serial peripheral interface protocols respectively. Although in this embodiment MMV 150 includes a control system 160 having microcontroller unit 160A, IMU 160B, a speed controller unit 160C, and wireless transceiver 160D, in other embodiments, the features and characteristics of the control system of MMV 150 may vary.

In this embodiment, when in the flying mode, the IMU 160B of control system 160 measures the attitude and angular rates of MMV 150 are processed by the microcontroller 160A and a control input is generated to each motor 185 of MMV 150 using a proportional derivative feedback controller with tunable gains executed by microcontroller 160A. As illustrated in FIG. 3, rotors 192A and 192C spin in counterclockwise direction and rotors 192B and 192D spin in clockwise direction. However, during the transition of MMV 150 to the ground mode of operation, the rotors 192C and 192D of MMV 150 are reversed in their direction and the angular speed of rotors 192C and 192D is decreased substantially (e.g., ten times lower angular speed than the flying mode in some embodiments).

In an embodiment, microcontroller unit 160A of control system 160 communicates with the speed control unit 160C through two control signals that determine magnitude of rotational speed and direction of the rotors 192A-192D, with power supplied from battery 155 of MMV 150. Additionally, in this embodiment, when in the ground mode of operation, microcontroller unit 160A of control system 160 transmits pulse-width-modulated signals to servos 170 that rotate rotors 192A-192D about shafts 190 by approximately 90 degrees. Therefore, by appropriately modulating the signals transmitted by microcontroller unit 160A, specific control movements in the flying as well as ground modes may be achieved. Table 1 below provides an exemplary summary of the various control signal states in each of these modes for this embodiment, with rotor 192A labeled "Rotor 1," rotor 192B labeled "Rotor 2," etc. It is noted that the direction of rotation of rotors 192A-192D is fixed in the flying or aerial mode of this embodiment but can be reversed as desired in land mode to actuate forward and backward motions as well as turns.

TABLE 1

|  | Rotor 1 | Rotor 2 | Rotor 3 | Rotor 4 | Servo 1 | Servo 2 |
|---|---|---|---|---|---|---|
| Aerial Mode (up/down motion) | CW (high rpm) | CCW (high rpm) | CW (high rpm) | CCW (high rpm) | 'Vertical' control | 'Vertical' control |
| Land Mode (forward/backward motion) | CW/CCW (low rpm) | CW/CCW (low rpm) | CCW/CW (low rpm) | CCW/CW (low rpm) | 'Horizontal' control | 'Horizontal' control |

In some embodiments, control system 160 comprises a circuit board designed using a four layer approach. In this embodiment, the power and ground layers are embedded between the top and bottom layers to improve compactness. In this embodiment, the signals have a minimum trace width of approximately 0.004 inches (in), the power signals with a trace width of approximately 0.008 in and the wires communicating wireless signals (RF) had a width of 0.032 in; however, in other embodiments, the circuit board design of control system 160 may vary. In some embodiments, thicker tracks may be used for the power lines of the circuit board to address potential issues associated with voltage drops and heating of the power lines. In certain embodiments, the radio frequency (RF) signal wires may be treated by keeping the RF signal wires on the top side of the circuit board and avoiding usage of any through-holes. Placement of components directly underneath RF components may also be avoided in some embodiments. In this embodiment, direct access to all of the signal pins of control system 160 is provided for space and weight optimization. In this embodiment, the circuit board of control system 160 is manufactured using standard FR-4 material with approximately 1 ounce copper thickness. Additionally, in this embodiment, the circuit board of control system 160 (with populated components) weighs approximately 1.5 grams; however, in other embodiments, the mass and process of manufacturing the circuit board of control system 160 may vary.

While embodiments of the disclosure have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A multi-modal vehicle, comprising:
a frame;
a rotor pivotally mounted to the frame, the rotor comprising a first position and a second position circumferentially spaced from the first position;
a motor coupled to the rotor and configured to rotate the rotor; and
a magnetic locking mechanism configured to lock the rotor in either the first position or the second position, wherein the magnetic locking mechanism comprises a shaft coupled to the motor and which is rotatable relative to the frame, a first magnet mounted on the shaft, a second magnet mounted on the shaft and which is circumferentially spaced from the first magnet, and a third magnet mounted on the frame;
wherein, when the rotor is disposed in the first position, the rotor is configured to generate lift when actuated by the motor;
wherein, when the rotor is disposed in the second position, the rotor is configured to engage a surface to transport the vehicle when actuated by the motor.

2. The vehicle of claim 1, further comprising a tilting system configured to actuate the rotor between the first and second positions, the tilting system comprising an actuator.

3. The vehicle of claim 2, wherein the actuator comprises a servo actuator.

4. The vehicle of claim 2, further comprising a control system configured to control the motor and the actuator using an algorithm.

5. The vehicle of claim 4, wherein the algorithm comprises a proportional-derivative feedback controller.

6. The vehicle of claim 1,
wherein the second position of the rotor is circumferentially spaced 90 degrees from the first position.

7. The vehicle of claim 1, wherein:
the first magnet is aligned with the third magnet when the rotor is in the first position and circumferentially spaced from the third magnet when the rotor is in the second position; and
the second magnet is aligned with the third magnet when the rotor is in the second position and circumferentially spaced from the third magnet when the rotor is in the first position.

8. A multi-modal vehicle, comprising:
a frame;
a plurality of rotors each pivotally mounted to the frame, each of the plurality of rotors comprising a first position and a second position circumferentially spaced from the first position about a first axis;
a motor coupled to at least one of the plurality of rotors and configured to rotate the at least one of the plurality of rotors about a second axis that is different from the first axis; and
a shaft rotatable relative to the frame and extending longitudinally between and coupled to a pair of rotors of the plurality of rotors,
wherein, when each of the plurality of rotors are disposed in the first position, the vehicle is disposed in an aerial mode;
wherein, when each of the plurality of rotors are disposed in the second position, the vehicle is disposed in a ground mode.

9. The vehicle of claim 8, wherein at least one of the plurality of rotors comprises at least one of carbon fiber prepreg, metal, and plastic.

10. The vehicle of claim 8, wherein at least one of the plurality of rotors comprises a plurality of circumferentially spaced blades and a rim extending about the blades.

11. The vehicle of claim 10, wherein:
the rim comprises a rim configured to provide traction to the vehicle when the vehicle is in the ground mode to transport the vehicle along a surface; and
the blades are configured to generate lift when the vehicle is in the aerial mode.

12. The vehicle of claim 10, wherein relative rotation is permitted between the cover and the blades of the rotor.

13. The vehicle of claim 8, further comprising a magnetic locking mechanism configured to lock at least one the plurality of rotors in either the first position or the second position, wherein the locking mechanism comprises:
a first magnet mounted on the shaft;
a second magnet mounted on the shaft, wherein the second magnet is circumferentially spaced from the first magnet; and
a third magnet mounted on the frame.

14. The vehicle of claim 8, further comprising a tilting system configured to actuate at least one of the plurality of rotors between the first and second positions.

15. The vehicle of claim 14, wherein the tilting system comprises:
an actuator coupled to the frame; and
an actuator arm coupled between the shaft and the actuator;
wherein, in response to actuation of the actuator, the actuator arm is configured to rotate the shaft and the motor.

16. The vehicle of claim 8, further comprising a control system including a microcontroller, an inertial measurement unit, a motor controller, and a wireless transceiver.

17. The vehicle of claim 8, wherein:
each of the plurality of rotors are configured to generate lift in response to actuation of the motor when the rotor is disposed in the first position; and each of the plurality of rotors are configured to engage a surface to transport the vehicle in response to actuation by the motor when the rotor is disposed in the second position.

18. The vehicle of claim 8, wherein the shaft is rotatable about the first axis relative to the frame.

* * * * *